United States Patent
Coleman et al.

(10) Patent No.: US 7,281,552 B1
(45) Date of Patent: Oct. 16, 2007

(54) WOOD CARVING ASSEMBLY AND A METHOD FOR MAKING THE SAME

(76) Inventors: Harrison L. Coleman, 43000 12 Oaks Crescent, Unit 5033, Novi, MI (US) 48377; Gerald E. Coleman, 100 Engineer St. Donaldson Ctr., Greenville, SC (US) 29605

( * ) Notice: Subject to any disclaimer, the term of this patent is extended or adjusted under 35 U.S.C. 154(b) by 0 days.

(21) Appl. No.: 11/082,565

(22) Filed: Mar. 17, 2005

(51) Int. Cl.
*B23C 1/16* (2006.01)

(52) U.S. Cl. .................. 144/360; 144/3.1; 144/144.1; 409/86; 409/109

(58) Field of Classification Search ........... 144/144.1, 144/144.52, 358–360, 371, 372; 409/124–126, 409/130, 109, 110, 86
See application file for complete search history.

(56) References Cited

U.S. PATENT DOCUMENTS

| | | | |
|---|---|---|---|
| 2,702,496 A * | 2/1955 | Davis et al. ............... | 409/124 |
| 3,942,566 A | 3/1976 | Schmidt | |
| 3,956,828 A | 5/1976 | Kloweit | |
| 4,183,284 A * | 1/1980 | Laskowski ............... | 409/89 |
| 4,256,155 A | 3/1981 | Hochstatter et al. | |
| 4,260,001 A | 4/1981 | De Muynck | |
| 5,036,895 A | 8/1991 | Lue | |
| 5,165,175 A | 11/1992 | Anderson | |
| 5,256,011 A * | 10/1993 | Taylor ................. | 409/92 |
| 5,641,321 A | 6/1997 | Suzuki | |
| 5,722,472 A | 3/1998 | Wang | |
| 5,884,680 A | 3/1999 | Kuo | |
| 5,993,123 A * | 11/1999 | Allred et al. ............ | 409/109 |
| 6,021,827 A | 2/2000 | Gregor et al. | |
| 6,112,783 A | 9/2000 | Newman | |
| 6,138,365 A | 10/2000 | Wilkins | |
| 6,641,340 B1 * | 11/2003 | Hajjar et al. ............ | 409/94 |

* cited by examiner

*Primary Examiner*—Shelley M. Self
(74) *Attorney, Agent, or Firm*—Law Offices of John Chupa & Associates, P.C.

(57) ABSTRACT

A carving assembly 10 for use in duplicating a blank or form. The carving assembly 10 includes stylus 112 and a tool holder 120 which are coupled together using a slidable carriage 14 to allow any movement of the stylus to cause a cutting tool 121 mounted in the tool holder 120 to move in the exact same manner. Carriage 14 is mounted upon a frame, assembly which permits sliding motion in two orthogonal directions 101, 102.

2 Claims, 8 Drawing Sheets

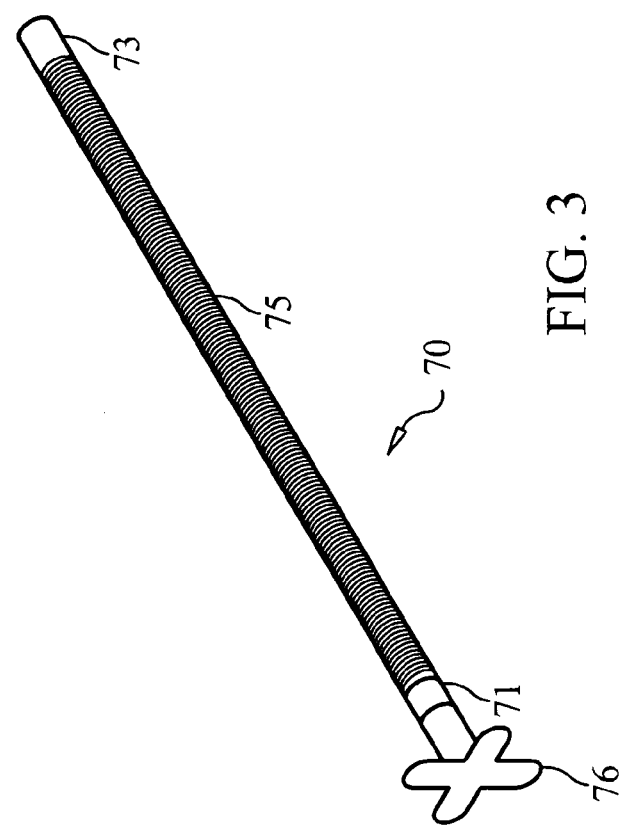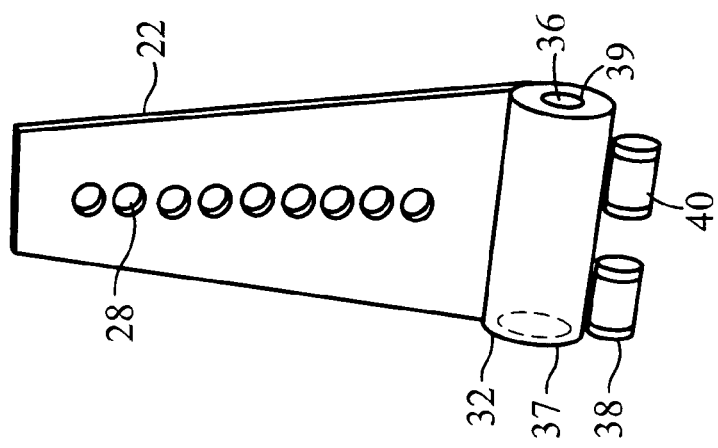

WOOD CARVING ASSEMBLY AND A METHOD FOR MAKING THE SAME

FIELD OF THE INVENTION

The present invention generally relates to a wood carving assembly and to a method for making or constructing a wood carving assembly and more particularly, to a wood carving assembly which is adapted to accurately and selectively duplicate an object.

BACKGROUND OF THE INVENTION

Wood carving entails the application or use of a cutting tool to a block of wood material to remove portions of the wood in order to shape that wood block into a desired configuration or design. Traditionally, these cutting tools are conventional hand tools such as chisels and saws which are used by an individual to manually remove portions of a piece of wood in order to shape this piece in any manner the individual desires. These hand tools have been supplemented with automated or motorized cutting tools, such as electric routers and sanders, which reduce the amount of physical work necessary to shape to wood. Further, computer controlled cutting machines are available which may be programmed to automatically perform the cutting a shaping process and eliminate the manual exertion altogether, while providing relatively high accuracy and repeatability.

The above delineated woods carving tools and methodologies, however, have certain disadvantages. Particularly, the manual and motorized cutting tools do not enable an individual to make relatively fast and accurate duplicates of an object. That is, these manual tools require an individual to re-create the object sought to be duplicated by either making time consuming measurements of the object or by "eye-balling" or estimating the cutting operations needed to make a copy of the object. This type of duplication technique is inherently inaccurate and time consuming as it depends almost entirely upon the artistic skill of the individual.

The automated and computer controlled "machining centers" described above suffer from other disadvantages. Namely, these machining centers are oftentimes very expensive, have a relatively large "footprint", and require formalized training in the programming language utilized by the computer controller. Additionally, these computer controlled machining centers may be able to accurately duplicate objects which are originally produced by that machine (i.e., the "original" object sought to duplicated was also carved by that computer controlled machine), but are unable to accurately duplicate objects which were not produced by that machine. Duplication of such an object would rely upon an individual to not only have the artistic skill necessary to accurately copy the object, but to also have the computer programming skill to translate the original object's shape into the computer language.

The present invention overcomes these and other disadvantages of the current wood carving tools and methodologies in a new and novel manner.

SUMMARY OF THE INVENTION

It is a first non-limiting advantage of the present invention to provide a wood carving assembly which overcomes some or all of the previously delineated disadvantages of prior wood carving assemblies.

It is a second non-limiting advantage of the present invention to provide a method for making a wood carving assembly which produces a wood carving assembly which overcomes some or all of the previously delineated disadvantages of prior wood carving assemblies.

It is a third non-limiting advantage of the present invention to provide a carving assembly for duplicating a form having a certain shape. Particularly, the provided wood caring assembly includes a frame assembly having a pair of substantially parallel and horizontal first rails, a second rail which is perpendicular to the pair of first rails, a pair of vertical support members each including at least one first linear bearing, wherein a unique one of the first rails is slidably disposed within each of the linear bearings, and wherein the second rail is disposed between the pair of vertical support members; a carriage assembly having a tubular member containing at least one second linear bearing and a first substantially flat mounting surface which is pivotally coupled to the tubular member, wherein the second rail is slidably disposed within the at least one second linear bearing; a handle member having a handle portion and a stylus portion, wherein the handle member is coupled to and orthogonally projects from the mounting surface and wherein the handle portion and the stylus portion extend from the handle member in substantially opposite vertical directions; a tool holder member which includes a collar portion which is adapted to selectively receive a conventional cutting tool, wherein the tool holder member is coupled to and orthogonally projects from the mounting surface, and a chain assembly which allows the form to be accurately duplicated.

It is a fourth non-limiting advantage of the present invention to provide a carving assembly. Particularly, the carving assembly comprises a pair of generally cylindrical and parallel X-axis rails; a pair of substantially vertical members which are slidably disposed upon the pair of X-axis rails, wherein the vertical members have a plurality of equally spaced and aligned apertures; a lead screw assembly which is selectively coupled to a unique one of the pair of vertical members, effective to increase the rigidity and accuracy along the X-axis rails; a generally cylindrical Y-axis rail which is selectively disposed within a unique pair of the aligned apertures; a movable carriage assembly which is slidably disposed upon the Y-axis rail, the carriage assembly having a pair of flanges orthogonally projecting therefrom; a mounting member which is pivotally coupled to the pair of flanges, and a chain assembly which allows a form to be accurately duplicated.

It is a fifth non limiting advantage of the present invention to provide a method for duplicating a shape of an object. The method includes duplicating a shape of a an object, the method comprising the steps of:

providing a frame assembly having a pair of horizontal and parallel first rails, a pair of vertical support members which are slidably disposed upon the pair of rails, and a horizontal second rail which is disposed orthogonal to the first rails;

slidably and pivotally coupling a tool carriage assembly to the second rail, wherein the tool carriage assembly includes a stylus and a cutting tool having a cutting member;

orienting the tool carriage so that the stylus and the cutting tool are substantially parallel to the surface; and providing a chain assembly to allow the shape to be accurately duplicated.

These and other features and advantages of the present invention will become apparent from a reading of the following detailed description of the preferred embodiment of the invention and by reference to the following drawings.

BRIEF DESCRIPTION OF THE DRAWINGS

FIG. 2 is a side perspective and partially unassembled view of one of the vertical support members, of the carving assembly which is shown in FIG. 1;

FIG. 3 is a side perspective view of one of the rods used by and operatively deployed within the carving assembly which is shown in FIG. 1;

DETAILED DESCRIPTION OF THE PREFERRED EMBODIMENT OF THE INVENTION

Figure 1:
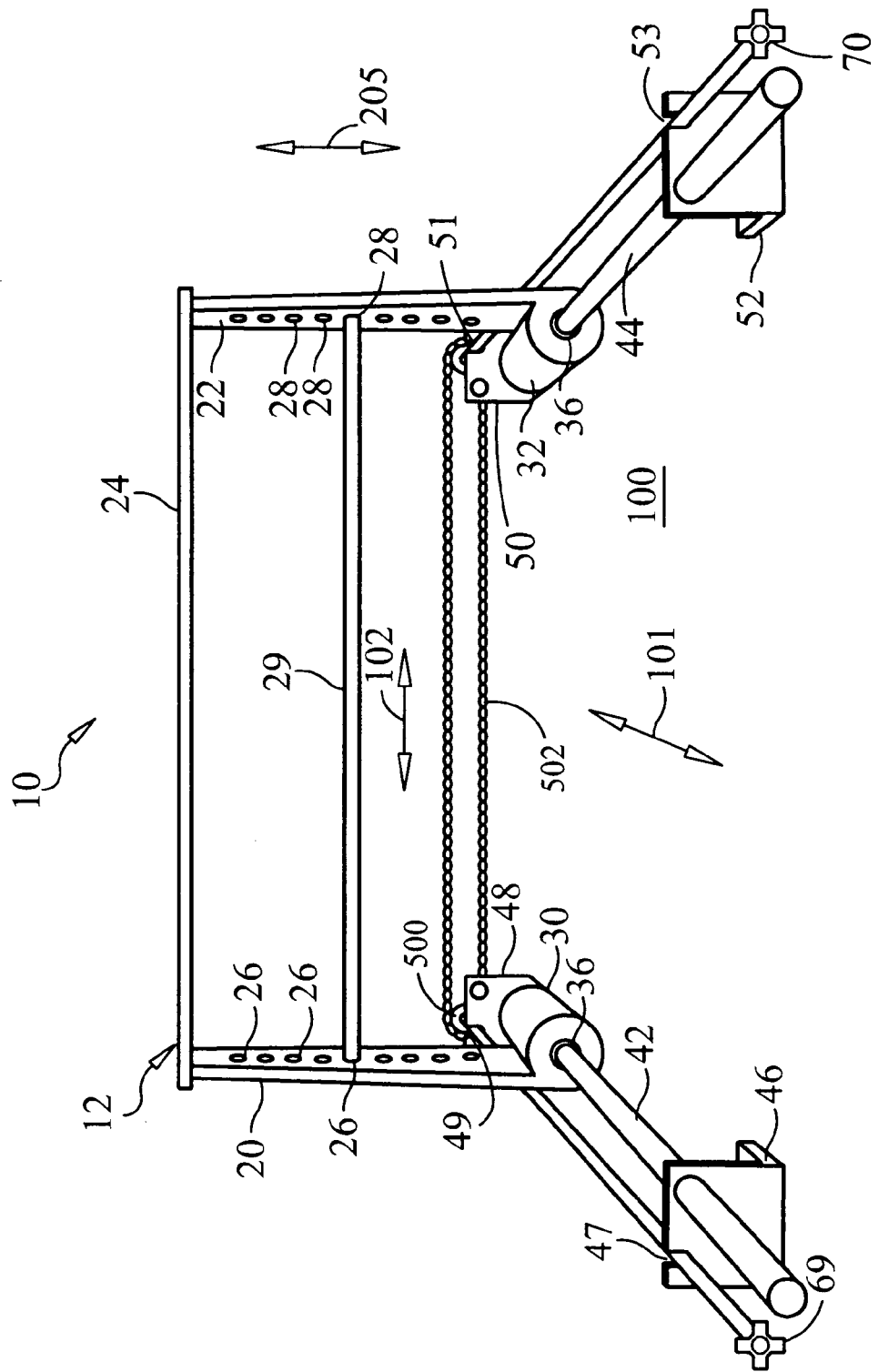
FIG. 1 is a partial front perspective and partially unassembled view of a carving assembly which is made in accordance with the teachings of the preferred embodiment of the invention.

As best shown in FIGS. 1-7, a carving assembly 10 is provided and is made in accordance with the teachings of the preferred embodiment of the invention. Assembly 10 is generally comprised of a frame assembly or a frame portion 12 and a tool carriage or tool head assembly portion or assembly 14. Frame portion 12 includes a pair of substantially vertical, identical, and generally "A"-shaped side members 20, 22. Members 20, 22 are coupled together by a substantially planar top member 24. Each member 20, 22 has a plurality of respective apertures 26, 28 which are vertically and equally and alignably spaced upon the respective members 20, 22. As shown, members 20, 22 are oriented and coupled together by a top member 24 in a manner which causes each aperture 26 of member 20 to be substantially aligned with (e.g., on the same horizontal axis with) a unique one of the respective apertures 28 of member 22. Frame members 20, 22, 24 are made, in one non-limiting embodiment, from a relatively rigid and strong material, such as and without limitation, an anodized aluminum material and fixedly reside upon a table or workstation 100.

Frame portion 12 further, in one non-limiting embodiment, includes a pair of substantially identical rail reception members 30, 32. Members 30, 32 are generally hollow and generally cylindrical in shape and are fixedly coupled to the "bottom" (e.g., the portion nearest the mounting table or surface 100) of respective "A"-shaped members 20, 22 in a conventional manner (e.g., by a conventional welding process). Members 30, 32 are substantially identical and it should be appreciated that the following description of member 32 is exemplary of each of the members 30, 32. Member 32 has a through aperture or cavity 36 which is approximately one and one quarter inches (1.25") in diameter and which is created or positioned substantially through the center of the member 32. A pair of linear bearings 38, 40 are fixedly secured within the respective ends 37, 39 of aperture 36 in a conventional manner, such as, but not limited to, respectively press fitting the bearings 38, 40 into the ends 37,39 of the aperture 36.

Further, frame 12 includes a cylindrical rail or "X-axis" rail 29 which is removably coupled to members 20, 22 through a unique pair of aligned apertures 26, 28. Rail 29 is formed from a hard smooth material such as a hardened metal (e.g., steel). Rail 29 provides a smooth mounting surface for tool carriage assembly 14, as will be discussed below. Frame 12 also includes a pair of substantially parallel cylindrical rails or "Y-axis" rails 42, 44 which are similar to rail 29, in one non-limiting embodiment. As shown, each rail 42, 44 is slidably and respectively inserted through the contained linear bearings 38, 40 of a unique one of the members 30, 32. Particularly, the linear bearings 38, 40 contained within the member 30, receivably cooperate with the rail 42 to provide a relatively smooth sliding surface along an axis which is substantially parallel to the "Y-axis" 101. Similarly, the linear bearings 38, 40, contained within the member 32, receivably cooperate with the rail 44 to provide a relatively smooth sliding surface along an axis which is substantially parallel to the "Y-axis" O1. That is, the pairs of bearings 38, 40, respectively contained within each member 30, 32, cooperatively permit coupled members 20, 22, 24, and rail 29 to translate together along the length of rails 42, 44 in a direction which is substantially parallel to axis 101.

Further, two pairs of "L-shaped" support members 46, 48 and 50, 52 respectively receive and support rails 42, 44. These support members 46, 48, 50 and 52 may be selectively coupled to any substantially flat and level surface, such as but not limited to, the workbench or work surface 100. Importantly, each support member 46-52 includes a respective groove or recess 47, 49, 51, 53 and recess pairs 47, 49; and 51, 53 may each selectively and respectively receives a lead screw 69, 70, which will be discussed in greater detail below. These pairs of support members 46-52 cooperatively elevate rails 42, 44 above the working surface 100 to create a clearance for the above described Y-axis type sliding motion. Rods 42, 44 may respectively terminate within and protrude from pairs 46, 48; and 50, 52.

That is, as described before, frame assembly 12 further includes a pair of substantially identical threaded lead screws 69, 70 which, when threadingly engaged with frame 12, increases the accuracy and rigidity of assembly 10 by selectively limiting the motion along an axis which is substantially parallel to the Y-axis 101. A discussion of screw 70 follows and, it should be appreciated that the discussion is equally applicable to screw 69. That is, when lead screw 70 is inserted into a pair of aligned grooves 51,53 the carriage portion 14 of assembly 10 (described more fully below) is substantially fixed in position unless a user rotates lead screw 70, in a manner which is more fully described below. The lead screw 69 is selectively inserted through grooves 47, 44.

Figure 4:
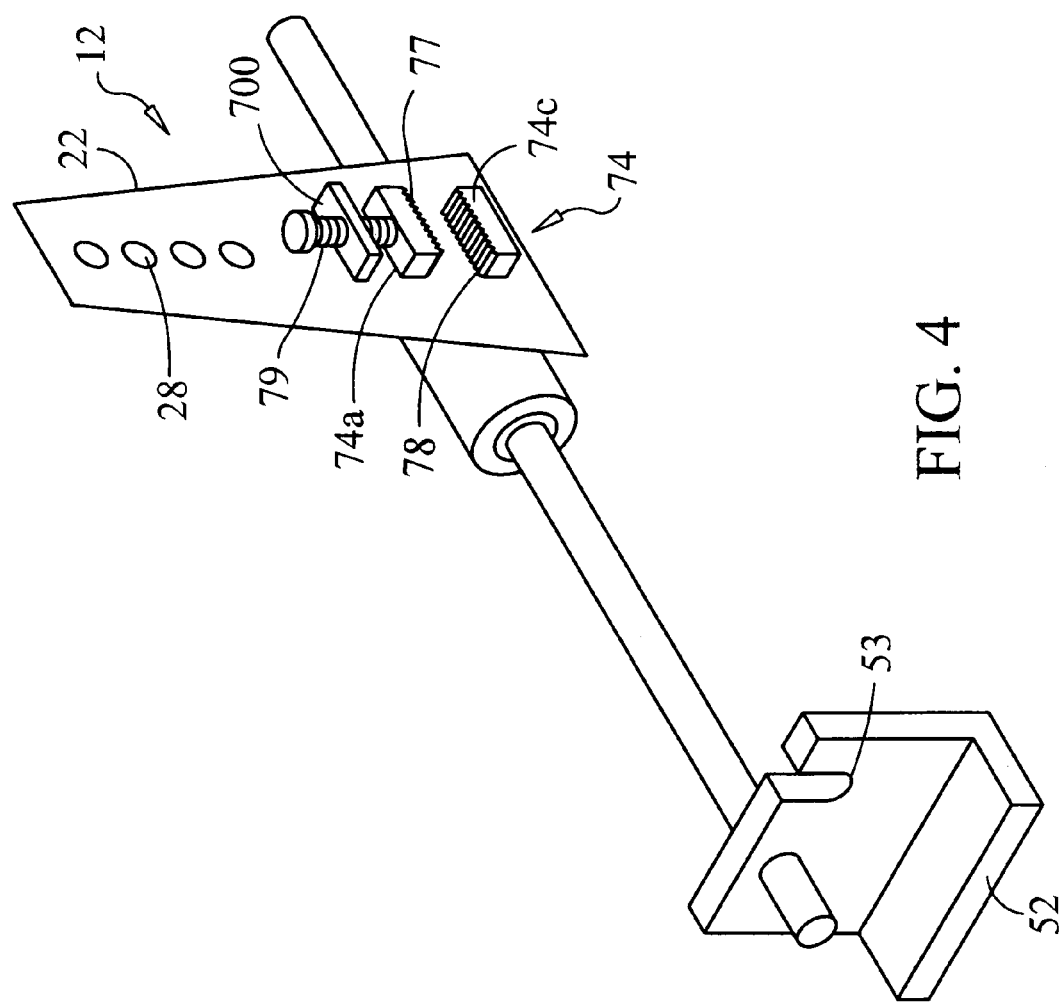
FIG. 4 is a side perspective view of a portion of the carving assembly which is shown in FIG. 1.

As shown best in FIG. 4, lead screw 70 maybe formed from a treaded rod 75 which, when screw 70 is selectively inserted into the grooves 47, 44, is substantially and linearly coextensive to the length of the rail 44. One end of lead screw 70 includes a "star shaped" handle 76, while the other end 73 is substantially smooth (i.e., lacking any threading) and is shaped to be receivably fitted within one of the groove 51 and to outwardly protrude there from. A similar smooth portion 71 is disposed in close proximity to handle 76. These smooth portions 71, 73 permit lead screw 70 to selectively rotate within the pair of receiving grooves 51, 53.

To selectively couple the lead screw 70 to the movable portions of assembly 10, a split nut assembly 74 is mounted upon member 22 (on an opposite surface of member 22 from the mounted member 32). As shown, the split nut assembly 74 which is mounted on member 22 includes a first portion 74a and a second portion 74c which is fixedly coupled to member 22 and which is disposed substantially below (e.g., toward surface 100) and vertically aligned with portion 74a. Portion 74c has a threaded surface 78 which is the same size and is "complementary" to the thread of lead screw 70. Similarly, portion 74a has a surface 77 which has threads which are complementary to the thread of the screw 70. Surfaces 78 and 77 cooperatively receive the screw 70. Portion 74a is adapted to receive a conventional fastener assembly 79 (e.g., a screw) that selectively moves portion 74a vertically relative to surface 78 of portion 74c. That is, a screw 79 may be inserted into and terminate within the portion 74a and movably disposed upon portion 22 by a clamp portion 700, which is coupled to member 22. A similar split nut assembly is mounted upon member 20 to operatively position screw 69 within assembly 10. In one non-limiting embodiment, the clamp 700 includes a threaded orifice which cooperates with the threads of the received screw 79 to allow the screw 79 to selectively move toward and away from portion 74c.

By utilizing relatively strong and interconnected components, frame assembly 12 provides a rigid support for the tool carriage 14. Tool carriage 14 includes a generally cylindrical X-axis rail reception member 80 which is substantially similar to members 30, 32 of frame 12. Further, member 80 includes an aperture 86 and a pair of linear bearings 88, 90 which slidably receive and cooperate with rail 29 to provide smooth translational movement of carriage 14 along an axis which is substantially parallel to the X-axis 102 (e.g., along and upon rail 29).

Member 80 differs from members 30, 32 by having a pair of orthogonally projecting and substantially identical flanges 81, 82 which extend in the same direction from member 80 and are substantially parallel to each other. Each flange 81, 82 includes, in the preferred embodiment of the invention an aperture 83 and a crescent or "C-shaped" aperture 84.

Carriage assembly 14 further includes a generally rectangular tool mounting member 92 which includes a pair of orthogonally projecting flanges 93, 94. As shown in FIG. 2, flanges 93, 94 included a pair of apertures 95, 96 and are oriented and spaced to respectively and operatively abut the inner surfaces of flanges 81, 82. Each pair of apertures 96, 95 are respectively aligned with a unique pair of apertures 83, 84 of a unique member 81,82, to respectfully permit a conventional fastener (e.g., a shoulder bolt) to pass through and couple the flange 81 to flange 93 and flange 82 to flange 94.

Importantly, it is desirable to have the tool mounting surface 91 of member 92 be substantially perpendicular to surface 100 for cutting purposes and, member 80 may pivot around rail 29 causing flanges 81, 82 to form substantially any angle 104 relative to the surface 100 and thereby causing surface 91 to selectively form a non-perpendicular angle relative to surface 100. Each pair of aligned apertures 83, 96 (and the respective fastener passing there through) provide a second pivot point, and the crescent shape of apertures 84, 95 permits a user to "re-orient" the surface 91 substantially perpendicular to surface 100. A conventional fastener may then be utilized, through each pair of aligned apertures 84, 95 to "lock" or maintain this perpendicular relationship while concomitantly causing member 92 to translate either toward or away from the surface 100. This limited elevational feature, in addition to the equally spaced plurality of apertures 26, 28 cooperate to allow a user to select substantially any height to dispose carriage 14 away from the surface 100 (and any workpiece which may be mounted thereon).

Figure 5:
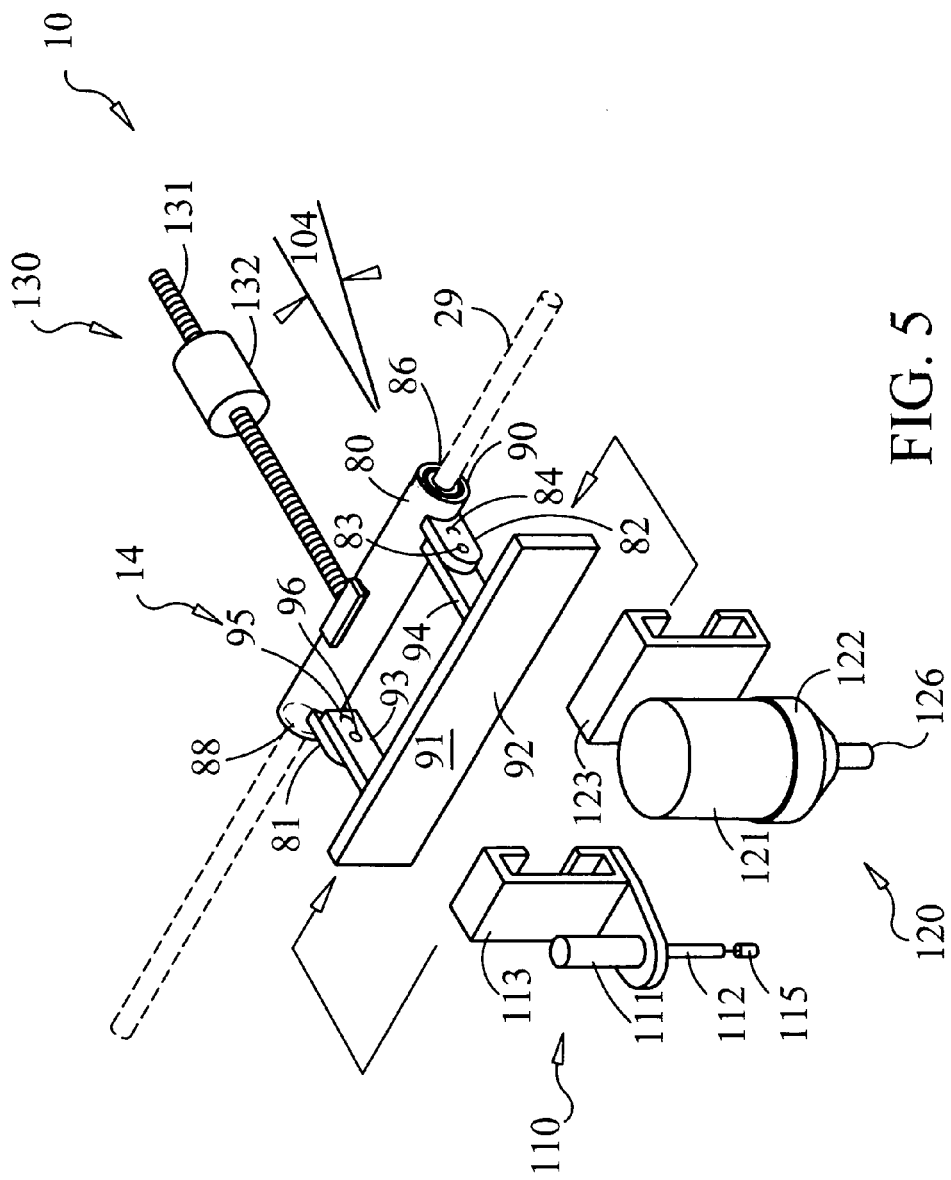
FIG. 5 is a partial exploded and unassembled perspective view of the head assembly portion of the carving assembly which is shown in FIG. 1.

Carriage assembly 14 further includes a handle member assembly 110. As shown in FIG. 5, handle member assembly 110 includes a first handle portion 111 and a second mounting portion 113 which is coupled to the handle portion 111. Handle portion 111 permits a user to manipulate carriage 14. Handle assembly or portion 110 further includes a vertically projecting stylus member 112 which extends in a direction toward to the surface 100 and which is coupled to portion 111. Mounting portion 113 is formed to be fixedly and selectively coupled to surface 91 of member 92 using conventional fasteners (e.g., by bolting portion 113 to surface 91).

Carriage assembly 14 further includes a tool holder assembly 120. Tool holder 120 includes a first adapter or collar portion 122 and a second mounting portion 123 which is substantially the same as mounting portion 113 which has been described above and which is coupled to portion 122. Adapter portion 122, which is attached to portion 113, is shaped to vertically receive a conventional cutting tool, such as but not limited to a router 121. That is, tool holder assembly 120 selectively and fixedly holds any of a plurality of cutting tools to the surface 91 of member 92. Importantly, the tip 115 of stylus 112 and the cutting edge 126 of the router 121 may be selectively adjusted to be substantially aligned vertically (e.g., to be linearly coextensive).

Carriage assembly 14 further includes a counterbalance arm assembly 130, which one non-limiting embodiment comprises a threaded rod 131 which is coupled to member 80. As shown in FIG. 3, counterbalance 130 further includes a counterweight 132 which is adapted to threading receive threaded rod 131 and which allows rod 131 to traverse there through and which may be selectively positioned along the length of rod 131 to counteract the weight positioned on the opposite side of the rail 29 (e.g., the side which handle portion 110 and tool holder 120 resides), which carriage 14 pivots and slides upon. As can be appreciated, weight 132 may be disposed in a manner which creates positive, negative, or neutral balance relative to the handle assembly 110 and tool assembly 120, depending upon the user's preferences. In other non-limiting embodiments, carriage 14 may further include a locking mechanism which operatively holds the carriage 14 at a certain position along an axis which is parallel to or comprise the X-axis 102.

In operation, as best shown in FIG. 5, a user places a form, mold, or other item desired to be copied or replicated 200 upon surface 100 substantially under the handle portion 110. A blank workpiece 202 of wood or other material which the user desires to form the copy of is disposed beneath the cutting tool 121. Depending upon the height of the workpiece 202 and form 200, the elevation or "Z-axis" orientation (along direction 205) may require adjustment by inserting rail 29 within a vertically appropriate pair of apertures 26, 28. Further correction to ensure that the stylus tip 115 and cutting edge 126 are substantially parallel to surface 100 may require an adjustment to the fastener positioned through C-shaped apertures 84, 95. The stylus tip 115 is then adjusted to the same height as the cutting edge 126 (e.g., they are made to be linearly coextensive).

The user of assembly 10 may then form a copy in workpiece 202 of the shape and contour of form 200 by manually guiding the tip 115 of the stylus 112 along the surface 201 of the form 200. Because cutting tool 121 and cutting edge 126 are both coupled to and aligned with stylus 112, any movement of stylus 112 will result in the exact movement of cutting edge 126 into and along the surface 203 of workpiece 202. Importantly, the size and shape of the tip 115 of the stylus is exactly the same as the size and shape of the cutting edge 126 used within the cutting tool 121. That way, every place the stylus is positioned within or along the surface 201 will result in the cutter 126 removing material from the workpiece 202 in the same relative location, thereby forming a surface 203, which is substantially the same as that of form 200. Under normal operation, a user manually manipulates the handle portion 110 and moves the carriage assembly 14 in both axes which are respectively parallel to the X-axis and the Y-axis by sliding assembly 14 along the respective rails 42, 44, and 29. If even greater precision is required however, lead screw 70 may be placed within grooves 51,53 to greatly increase the accuracy and rigidity of the assembly 10 and lead screw 69 may be placed within grooves 47, 49. That is, by coupling member 22 to the lead screw 70 using the split nut 74, a user can substantially prevent carriage 14 (e.g., the members 42, 44) from translating in a parallel direction axis 101, unless the lead screw 70 is rotated (e.g., the friction between screw 70 and member 22 is reduced. Accuracy is thereby increased, as the amount of movement, parallel to axis 101, is controlled by the threaded relationship between the lead screw 70 and the split nut 74. A second lead screw 69 may be utilized through grooves 47, 49, and upon member 20, in the manner indicated above.

Figure 6:
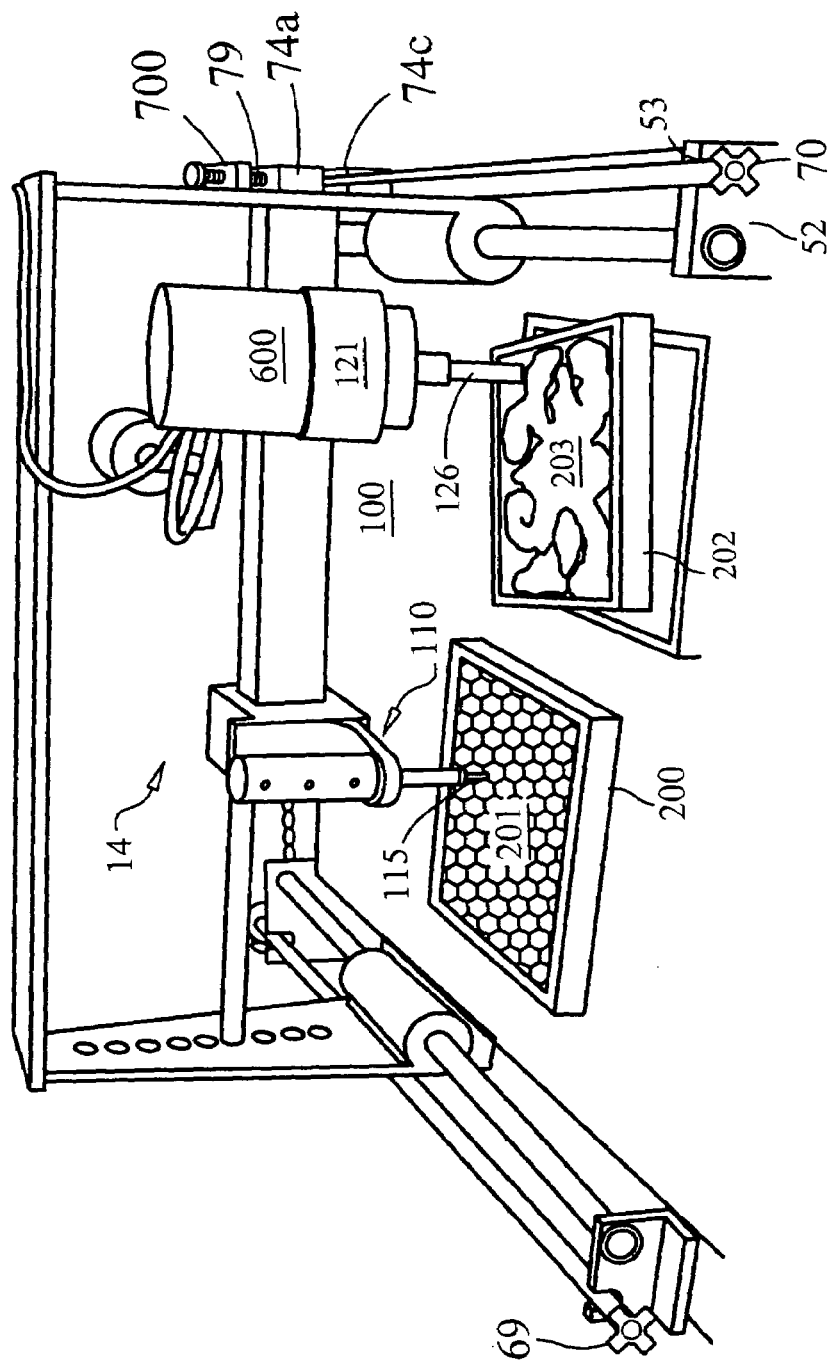
FIG. 6 is a front perspective assembled view of the carving assembly which is shown in FIG. 1.
Figure 7:
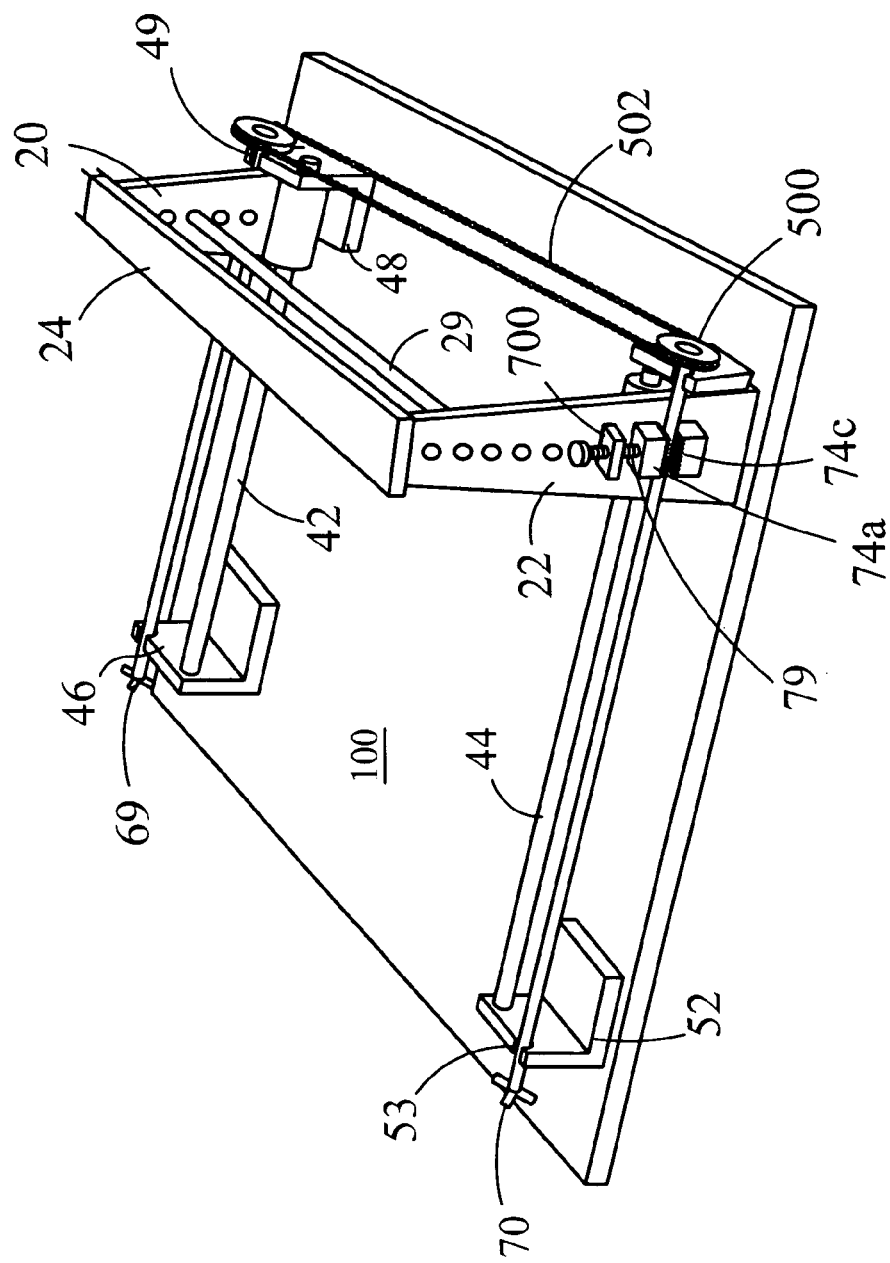
FIG. 7 is a side perspective view of the carving assembly which is shown in FIG. 1.
Figure 8:
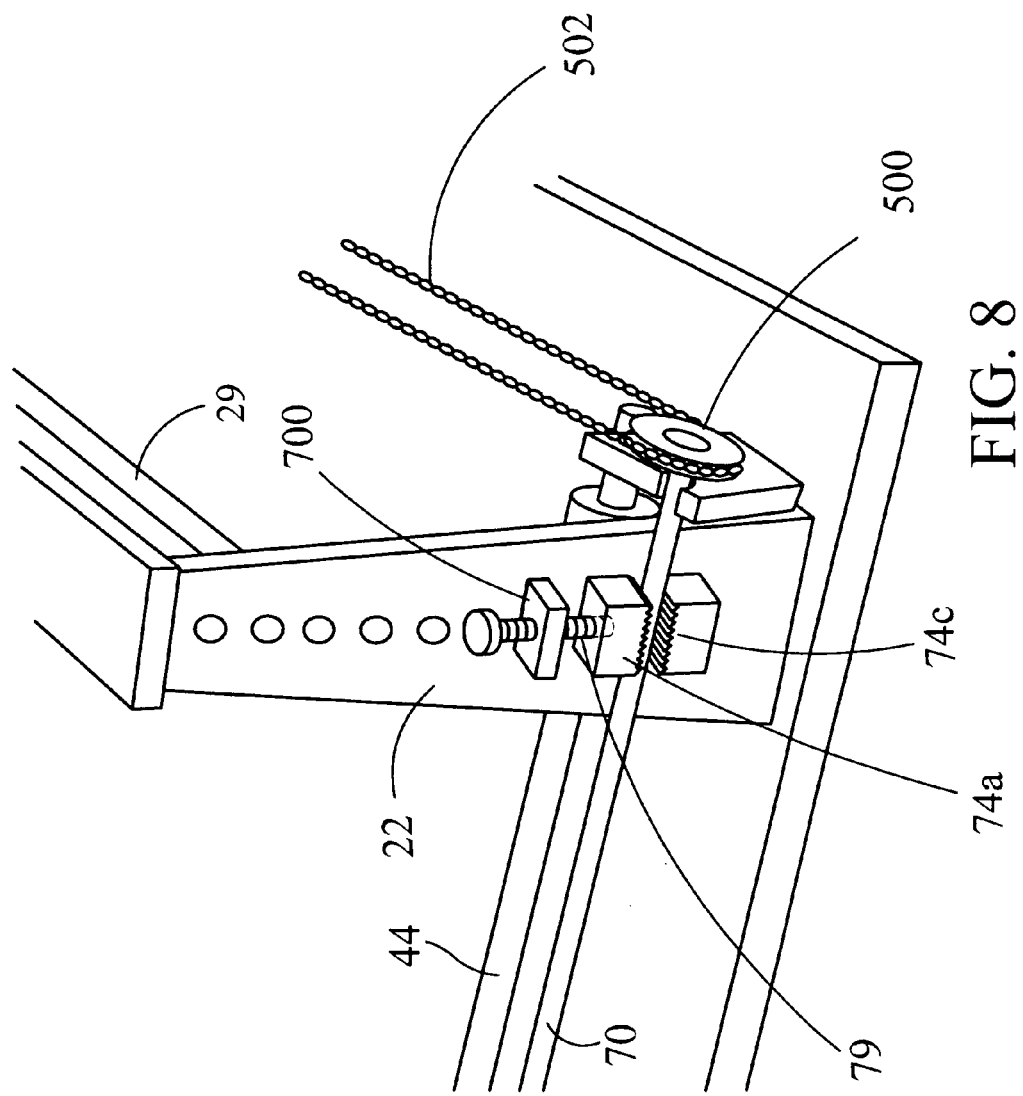
FIG. 8 is an exploded partial view of the carving assembly which is shown in FIG. 6.
Figure 9:
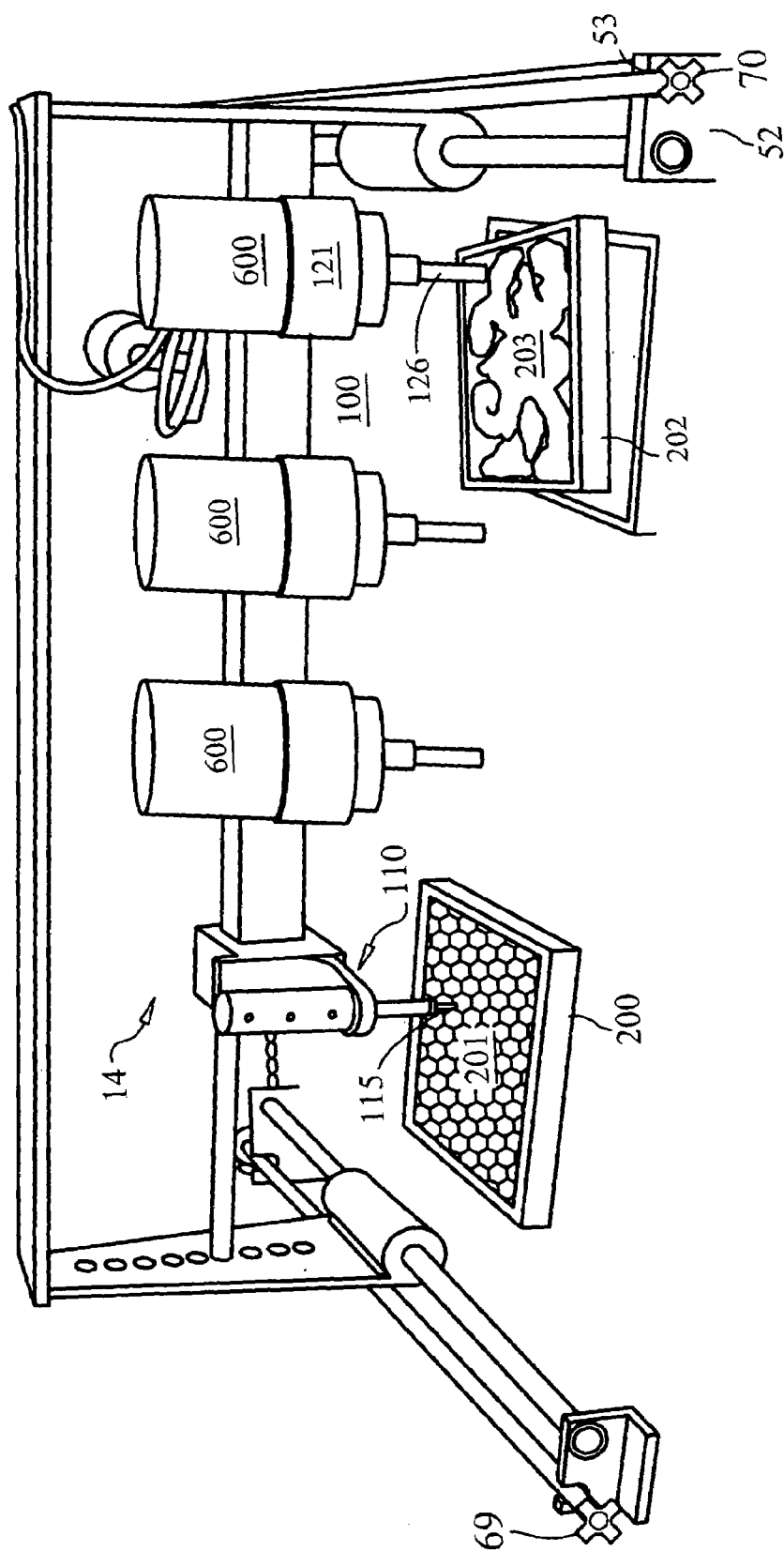
FIG. 9 is a front view of a carving assembly which is made in accordance with the teachings of an alternate embodiment of the invention.

In one non-limiting embodiment, as shown best in FIGS. 1, 6, and 8, each lead screw 69,70 movably and respectively receives a sprocket 500 and each sprocket 500 receives the chain 502 which couples the sprockets 500. This arrangement greatly enhances the accuracy of operation. Further, as shown best in FIG. 8, the portion 14 may include a plurality of heads routers 600 in order to greatly increase the amount of duplication which may be achieved during a certain period of time.

It is to be understood that the present invention is not limited to the exact construction or methodology which has been previously delineated, but that various changes and modifications may be made without departing from the spirit and the scope of the invention as delineated in the following claims. A1 A1 A1 A1

What is claimed is:

1. A carving assembly for duplicating a form having a certain shape, the carving assembly comprising:

a frame assembly having a pair of substantially parallel and horizontal first rails, a second rail which is perpendicular to the pair of first rails, a pair of vertical support members each including at least one first linear bearing, wherein a unique one of the first rails is slidably disposed within each of the linear bearings, and wherein the second rail is disposed between the pair of vertical support members;

a carriage assembly having a tubular member containing at least one second linear bearing and a first substantially flat mounting surface which is pivotally coupled to the tubular member, wherein the second rail is slidably disposed within the at least one second linear bearing;

a handle member which is coupled to said carriage assembly, said handle member having a handle portion and a stylus portion, wherein the handle member is coupled to and orthogonally projects from the mounting surface and wherein the handle portion and the stylus portion extend from the handle member in substantially opposite vertical directions; and a tool holder member which is coupled to said carriage assembly, wherein the tool holder member includes a collar portion which is adapted to selectively receive a conventional cutting tool, wherein the tool holder member is coupled to and orthogonally projects from the mounting surface and wherein said tool holder member moves in response to said movement of said holder member; and a chain assembly operatively coupled to the carriage assembly, wherein the chain assembly includes first and second screw members which are each movably coupled to the frame assembly and a chain which is coupled to each of said screw members, said chain assembly being effective to restrain movement of said carriage assembly in a certain direction thereby allowing said tool holder member to accurately carve a workpiece in response to said movement of said holder member.

2. A method for duplicating a shape of an object, the method comprising the steps of:

providing a frame assembly having a pair of horizontal and parallel first rails, a pair of vertical support members which are slidably disposed upon the pair of rails, and a horizontal second rail which is disposed orthogonal to the first rails;

slidably and pivotally coupling a tool carriage assembly to the second rail, wherein the tool carriage assembly includes a stylus and a cutting tool having a cutting member;

orienting the tool carriage so that the stylus and the cutting tool are substantially parallel to a surface; and providing a chain assembly coupled to said carriage assembly, wherein said chain assembly includes first and second screw members which are each movably coupled to the frame assembly and a chain which is coupled to each of said screw members, said chain assembly being effective to restrain movement of said carriage assembly in a certain direction thereby allowing said tool to accurately carve a workpiece in response to said movement of said stylus.

* * * * *